United States Patent
Chung

(10) Patent No.: US 10,257,378 B1
(45) Date of Patent: Apr. 9, 2019

(54) POSITIONING MODULE AND HANDHELD SCANNER USING THE SAME

(71) Applicant: Teco Image Systems Co., Ltd., Taipei (TW)

(72) Inventor: Ming-Chieh Chung, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 0 days.

(21) Appl. No.: 15/843,270

(22) Filed: Dec. 15, 2017

(30) Foreign Application Priority Data

Dec. 12, 2017 (TW) .............................. 106143483 A

(51) Int. Cl.
*H04N 1/00* (2006.01)
*H04N 1/107* (2006.01)
*G01D 5/347* (2006.01)

(52) U.S. Cl.
CPC ......... *H04N 1/1075* (2013.01); *G01D 5/3473* (2013.01); *H04N 1/00251* (2013.01); *H04N 2201/0081* (2013.01)

(58) Field of Classification Search
None
See application file for complete search history.

(56) References Cited

U.S. PATENT DOCUMENTS

| 5,355,146 A * | 10/1994 | Chiu ................... G06F 3/03544 345/156 |
| 2015/0077768 A1* | 3/2015 | Edgar ................ G06K 9/00483 358/1.5 |

* cited by examiner

*Primary Examiner* — Andrew H Lam
(74) *Attorney, Agent, or Firm* — Kirton McConkie; Evan R. Witt

(57) ABSTRACT

The disclosure is related to a positioning module and a handheld scanner using the same. The positioning module includes a base, a rotation support member, a shaft body, a wheel, a first sensor, and a second sensor. The rotation support member is pivoted to the base and rotates relative to the base about the first axis. The shaft body and the wheel are pivotally contacted to the main body and in constant contact with each other. When the wheel is rotated about a second axis due to a frictional force, the main body displace linearly and the shaft body is driven to rotate. Since the second axis is offset by the first axis, the rotation support member is driven to rotate at an angular displacement synchronously. The first and second sensors detect the shaft body and the main body to obtain the linear and angular displacements for positioning.

20 Claims, 13 Drawing Sheets

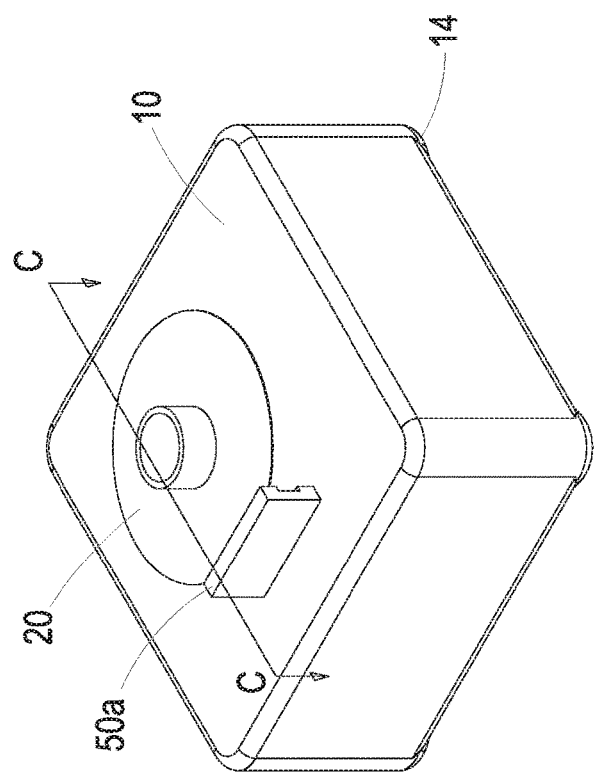

POSITIONING MODULE AND HANDHELD SCANNER USING THE SAME

FIELD OF THE INVENTION

The present invention relates to a positioning module, and more particularly to a positioning module and a handheld scanner using the same.

BACKGROUND OF THE INVENTION

The handheld scanner sweeps through the surface of the document by the hand movements of the user so as to obtain the contents of the document. Compared with the flatbed scanner, the handheld scanner can scan along a proper path without the limitation of the size of the original document and incorporate with the operation of combining images, so that the scanning operation of the large-sized document can be achieved.

However, when the handheld scanner is in use, it is difficult to move the scanner at a fixed speed. Moreover, during the period of scanning, the handheld scanner may deviate the predetermined scan path slightly or cause dither, and that results in distortion or deformation of the scanned image. Therefore, the handheld scanner is usually incorporated with a positioning module to detect the scan path for positioning the handheld scanner. Conventional handheld scanners utilize a single row or dual rows of rollers in combination with a rotary encoder or an optical mouse sensor to achieve the purpose of positioning the handheld scanner. While the roller is combined with rotary encoder for positioning, the scan path will be subject to the rolling restrictions and cannot change the scan direction arbitrarily. Alternatively, while the optical mouse sensor is used to sense the paper directly for positioning the handheld scanner, the scanner with the optical mouse sensor can change the moving direction to scan. However, the optical mouse sensor will easily produce errors due to the surface quality of different papers. Consequently, the handheld scanner with the optical mouse sensor cannot achieves to position precisely and it causes the image quality poor.

Therefore, there is a need of providing a positioning module and a handheld scanner using the same to overcome the above drawbacks.

SUMMARY OF THE INVENTION

An object of the present invention is to provide a positioning module and a handheld scanner using the same. The positioning module is relative to the handheld scanner and configured to detect plural sets of positioning data along a scan path of the handheld scanner. Each set of positioning data is constructed by a linear displacement and an angular displacement. The plural sets of positioning data are relative to plural image data captured by the handheld scanner along the scan path. By combining the plural image data according to the corresponding positioning data, it facilities to achieve the scanning operation for large-scale documents.

Another object of the present invention is to provide a positioning module and a handheld scanner using the same. With two sensors detecting linear displacements and angular displacements of the combination of an offset swivel wheel and a shaft body in the positioning module, it facilitates the scan path of the handheld scanner to be positioned accurately. In case of two sensors constructed by the optical mouse sensors, it further facilitates the positioning module to minimize the entire size and be integrated in the handheld scanner effectively. Since the optical mouse sensors achieve positioning by detecting the offset swivel wheel and the shaft body instead of detecting the surface of the scanned object directly, it avoids the sensing accuracy error of the positioning module caused by the different surface characteristics of the scanned object.

In accordance with an aspect of the present invention, there is provided a positioning module includes a base, a rotation support member, a shaft body, a wheel, a first sensor and a second sensor. The base includes an accommodation space, a through hole and an opening. The through hole is relative to the opening. The through hole and the opening are communicated with the accommodation space. The rotation support member is connected pivotally with the base via the through hole and rotated relative to the base about a first axis. The rotation support member includes a main body and a rotary plate. The rotary plate is centered on the first axis. The main body is received in the accommodation space and extends along a direction from the through hole to the opening. The shaft body is connected pivotally to the main body of the rotation support member. The wheel is connected pivotally to an end of the main body of the rotation support member and relative to the shaft body. The wheel is in constant contact with the shaft body and partially passes through the opening. While the wheel is affected by a frictional force and rotates about a second axis, the main body is moved to generate a linear displacement and the shaft body is rotated. The second axis is offset from the first axis. While the wheel is affected by the frictional force, the wheel drives the main body of the rotation support member to rotate about the first axis at an angular displacement. The first sensor is disposed on the rotation support member and configured to detect rotation of the shaft body to obtain the linear displacement of the main body. The second sensor is disposed on the base and configured to detect the rotary plate to obtain the angular displacement of the main body of the rotation support member.

In accordance with another aspect of the present invention, there is provided a handheld scanner includes an image capture unit and a positioning module. The image capture unit is configured to capture plural image data along a scan path on a surface of an object. The positioning module is connected with the image capture unit. While the image capture unit captures plural image data along the scan path on the surface of the object, the positioning module generates plural sets of positioning data relative to the plural image data. The positioning module includes a base, a rotation support member, a shaft body, a wheel, a first sensor and a second sensor. The base includes an accommodation space, a through hole and an opening. The through hole is relative to the opening. The through hole and the opening are communicated with the accommodation space. The rotation support member is connected pivotally with the base via the through hole and rotated relative to the base about a first axis. The rotation support member includes a main body and a rotary plate. The rotary plate is centered on the first axis. The main body is received in the accommodation space and extends along a direction from the through hole to the opening. The shaft body is connected pivotally to the main body of the rotation support member. The wheel is connected pivotally to an end of the main body of the rotation support member and relative to the shaft body. The wheel is in constant contact with the shaft body and partially passes through the opening. While the wheel is affected by a frictional force and rotates about a second axis, the main body is moved to generate a linear displacement and the shaft body is rotated. The second axis is offset from the first axis. While the wheel is affected by the frictional force, the wheel drives the main body of the rotation support member to rotate about the first axis at an angular displacement. The first sensor is disposed on the rotation support member and configured to detect rotation of the shaft body to obtain the linear displacement of the main body. The second sensor is disposed on the base and configured to detect the rotary plate to obtain the angular displacement of the main body of the rotation support member. Each set of positioning data includes the linear displacement and the angular displacement.

The above contents of the present invention will become more readily apparent to those ordinarily skilled in the art after reviewing the following detailed description and accompanying drawings, in which:

BRIEF DESCRIPTION OF THE DRAWINGS

FIG. 5 is a perspective view illustrating a positioning module according to a second preferred embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
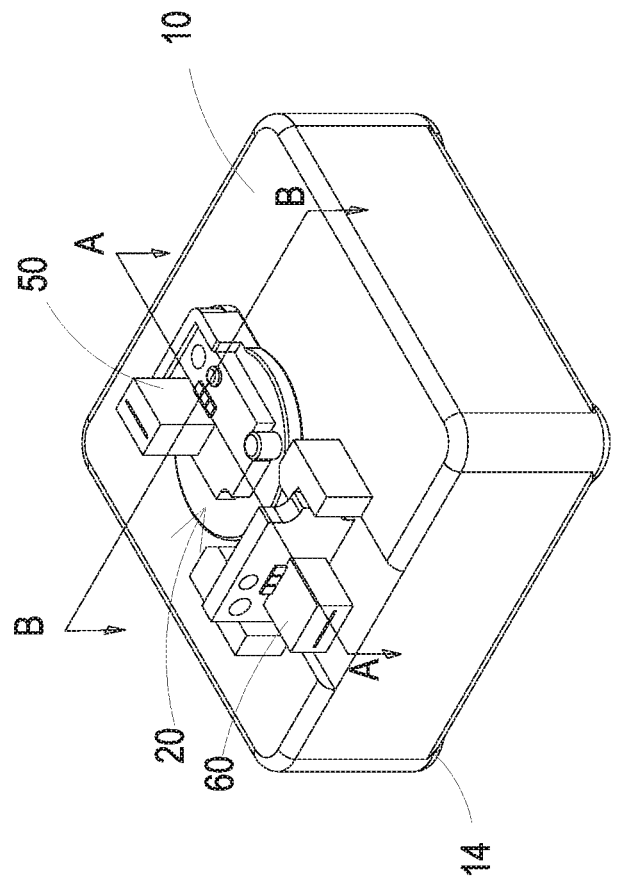
FIG. 1 is a perspective view illustrating a positioning module according to a first preferred embodiment of the present invention.
Figure 2:
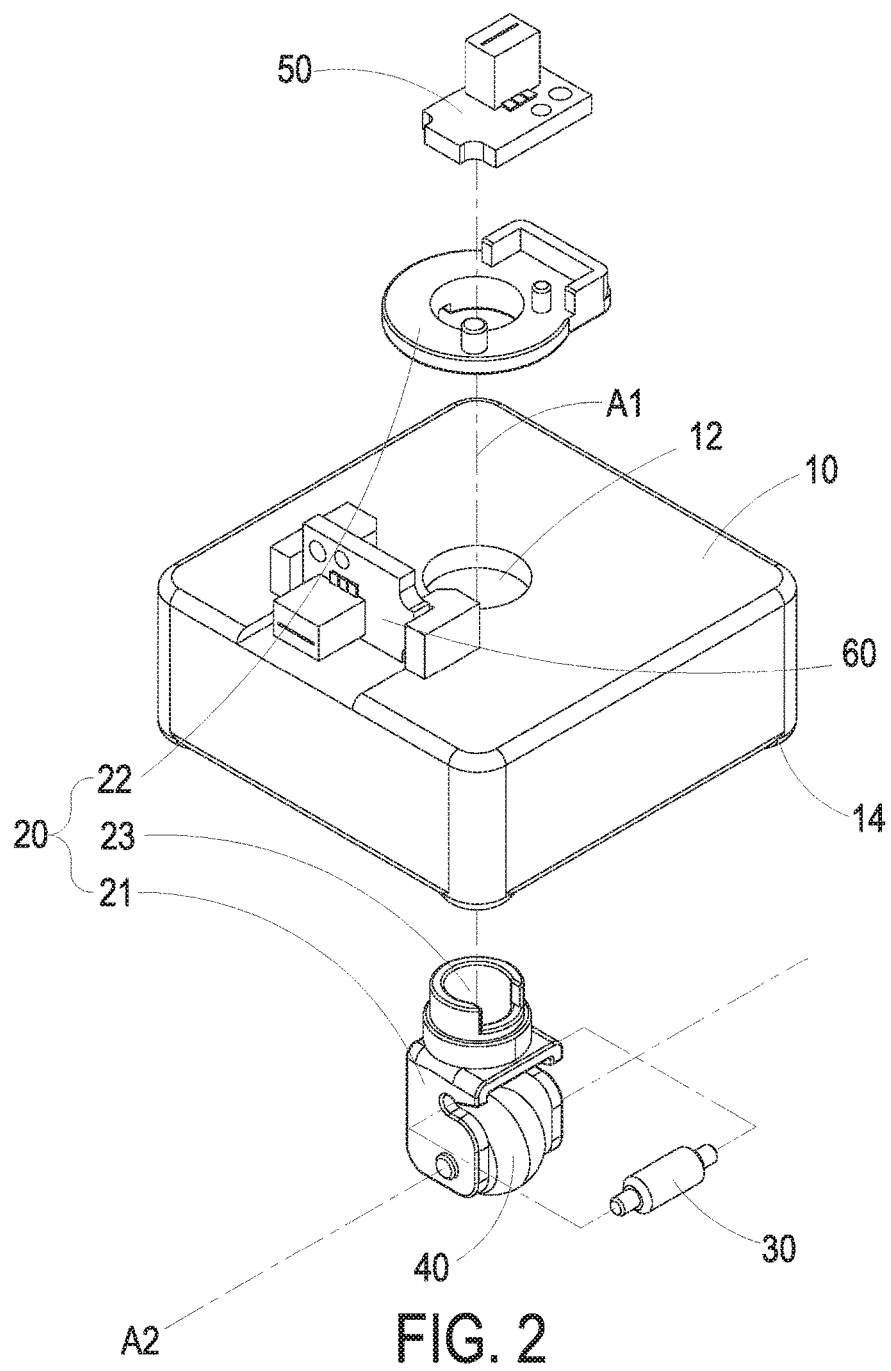
FIG. 2 is an exploded view illustrating the positioning module according to the first preferred embodiment of the present invention.
Figure 3A:
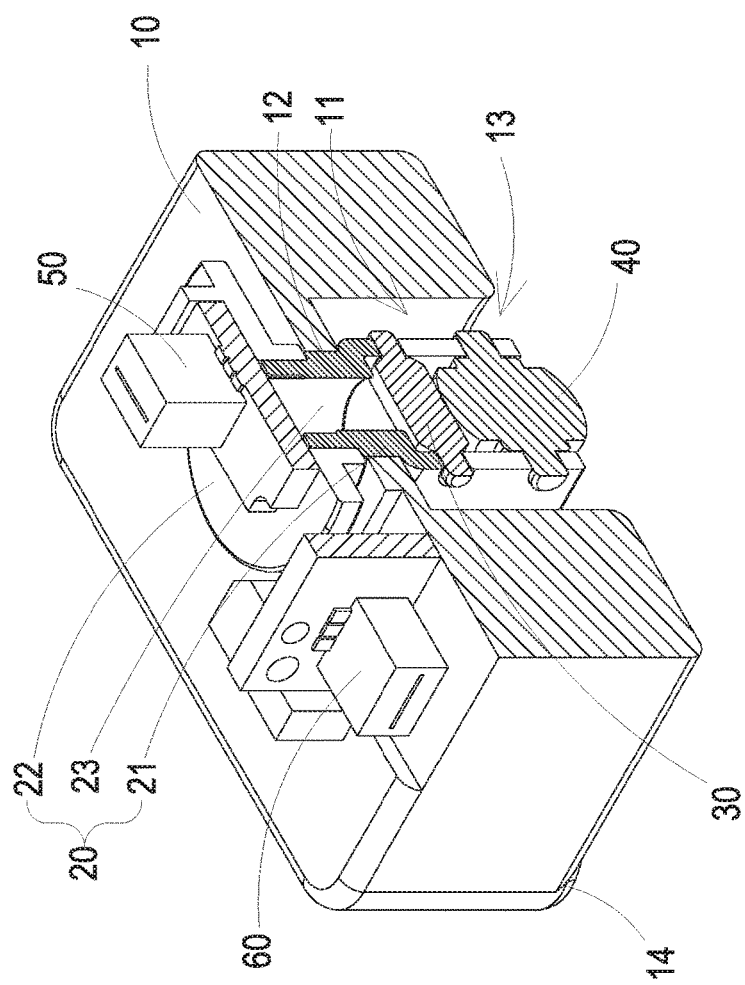
FIG. 3A is cross-sectional view taken along the line AA of FIG. 1.
Figure 3B:
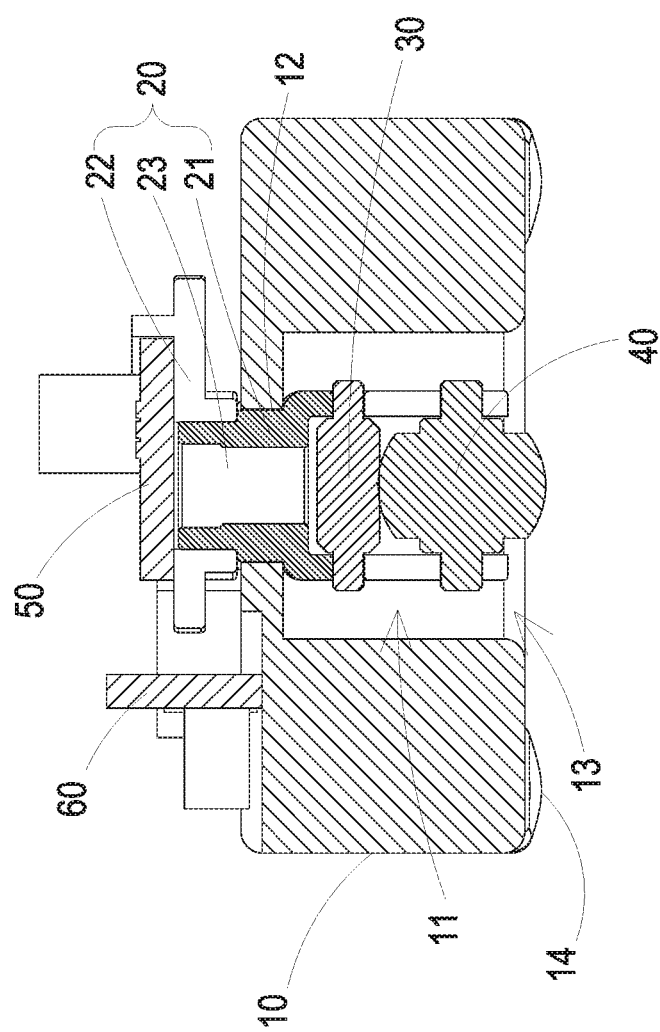
FIG. 3B is a lateral view of FIG. 3A.
Figure 4A:
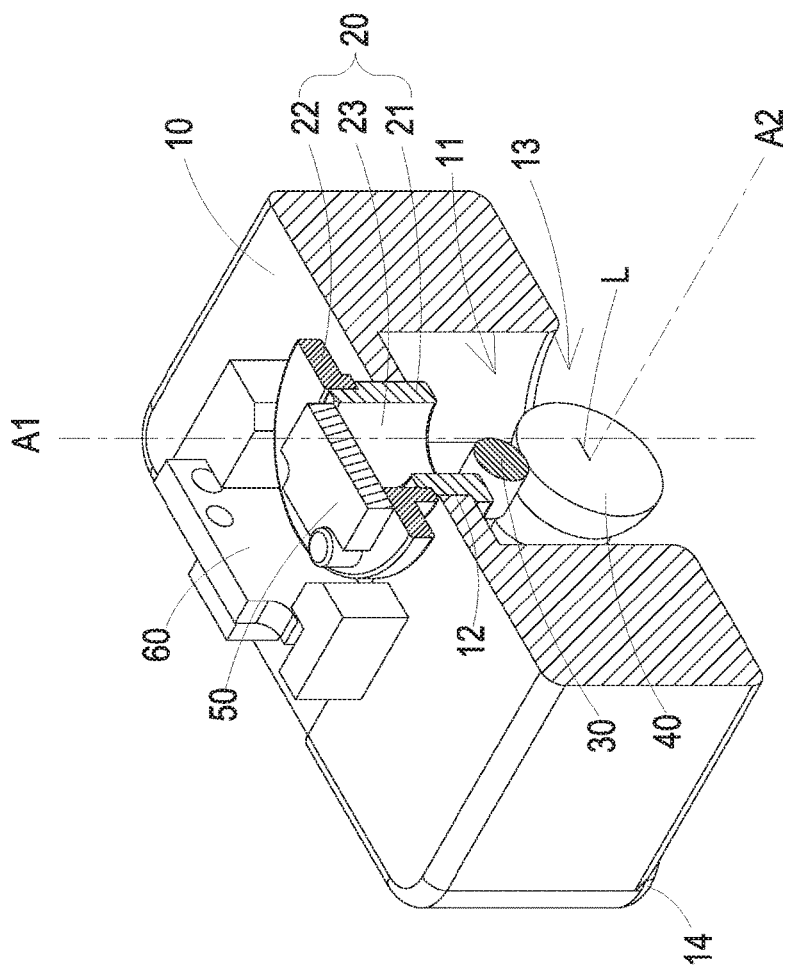
FIG. 4A is cross-sectional view taken along the line BB of FIG. 1.
Figure 4B:
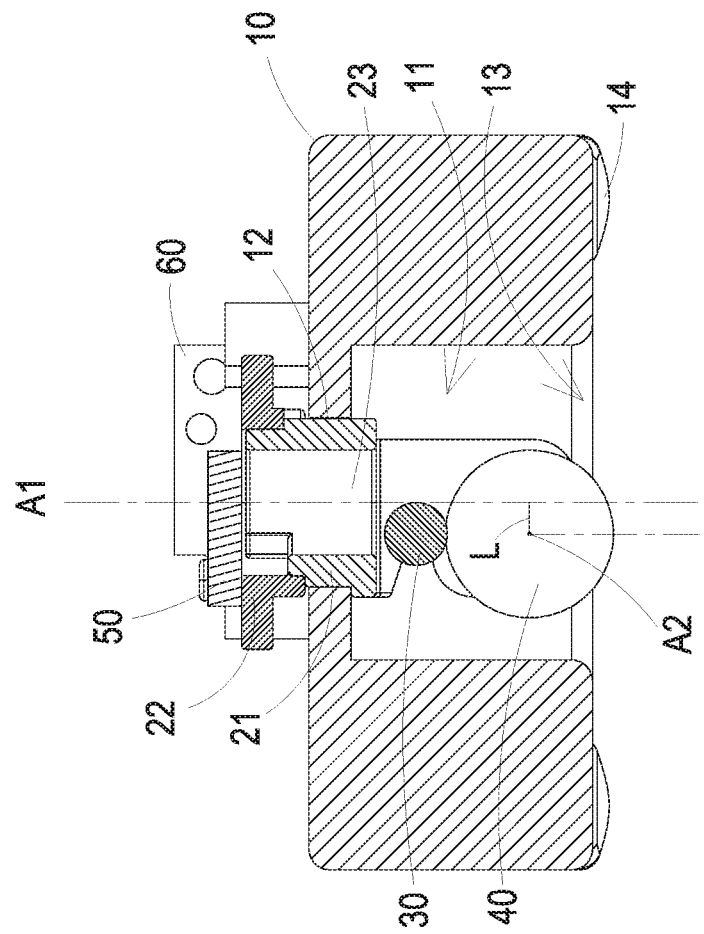
FIG. 4B is a lateral view of FIG. 4A.

FIG. 1 is a perspective view illustrating a positioning module according to a first preferred embodiment of the present invention. FIG. 2 is an exploded view illustrating the positioning module according to the first preferred embodiment of the present invention. FIG. 3A is cross-sectional view taken along the line AA of FIG. 1. FIG. 3B is a lateral view of FIG. 3A. FIG. 4A is cross-sectional view taken along the line BB of FIG. 1. FIG. 4B is a lateral view of FIG. 4A. In the embodiment, positioning module 1 includes a base 10, a rotation support member 20, a shaft body 30, a wheel 40, a first sensor 50 and a second sensor 60. The base 10 includes an accommodation space 11, a through hole 12 and an opening 13. The through hole 12 is relative to the opening 13. The through hole 12 and the opening 13 are communicated with the accommodation space 11. The rotation support member 20 is connected pivotally with the base 10 via the through hole 12 and rotated relative to the base 10 about a first axis A1. In the embodiment, the first axis A1 can be for example a vertical axis. In addition, the rotation support member 20 includes a main body 21 and a rotary plate 22. The rotary plate 22 is centered on the first axis. The main body 21 is received in the accommodation space 11 and extends along a direction from the through hole 12 to the opening 13. The shaft body 30 is connected pivotally to the main body 21 of the rotation support member 20 for example along but not limited to the horizontal direction. In the meantime, the wheel 40 is relative to the shaft body and connected pivotally to an end of the main body 21 of the rotation support member 20 for example along but not limited to the horizontal direction. The center axis of the wheel 40 is parallel to the central axis of the shaft body 30. Moreover, the outer periphery of the wheel 40 is in constant contact with the outer periphery of the shaft body 30. The wheel 40 partially passes through the opening 13. While the portion of the wheel 40 out of the opening 12 is affected by a frictional force and rotates about a second axis A2, the main body 21 and the base 10 are moved to generate a linear displacement and the shaft body 30 is driven to rotate by the rotating wheel 40. The second axis A2 is offset from the first axis A1. Furthermore, the first axis A1 and the second axis A2 are two skew lines in the three-dimensional space. The first axis A1 and the second axis A2 include a vertical connection line L connected therebetween and perpendicular to the first axis A1 and the second axis A2, respectively. Since the first axis A1 and the second axis A2 are two skew lines in the three-dimensional space, the length of the vertical connection line L is more than 0. While the wheel 40 is affected by the frictional force, the vertical connection line L tends to parallel to the direction of the frictional force, and the wheel 40 drives the main body 21 of the rotation support member 20 to rotate about the first axis A1 at an angular displacement. When the vertical connection line L is parallel to the direction of the frictional force, the wheel 40 rotates to displace the rotation support member 20 and the base 10 linearly, but the rotation support member 20 is not rotated relative to the base 10. In the meantime, the angular displacement is zero radians. Moreover, the first sensor 50 is disposed on the rotation support member 20 and configured to detect rotation of the shaft body 30 so as to obtain the linear displacement of the main body 21 and the base 10. The second sensor 60 is disposed on the base 10 and configured to detect the rotary plate 22 to obtain the angular displacement of the main body 21 of the rotation support member 20.

In the embodiment, the rotary plate 22 of the rotation support member 20 is connected with the main body 21 for example by passing through the through hole 12 of the base 10, so that rotation support member 20 can be connected pivotally with the base 10 via the through hole 12 and rotated relative to the base 10 about a first axis A1. The main body 21 and the rotary plate 22 of the rotation support member 20 are located at two opposite ends of the through hole 12, respectively. In the embodiment, the main body 21 and the rotary plate 22 of the rotation support member 20 are connected together by for example but not limited to engaging with each other. The rotation support member 20 further includes an axle hole 23. The axle hole 23 passes through the rotary plate 22 and the main body 21 along the first axis A1. In the embodiment, the first sensor 50 can be for example but not limited to an optical mouse sensor and disposed on the rotary plate 22 of the rotation support member 20. Moreover, the first sensor 51 has a sensing side facing to the shaft body 30 through the axle hole 23. Thus, the first sensor 50 can be configured to detect rotation of the shaft body 30 and obtain the linear displacement of the main body 21 and the base 10. In the embodiment, the second sensor 60 can be for example but not limited to an optical mouse sensor and disposed on the base 10. Furthermore, the second sensor 60 is relative to a peripheral edge of the rotary plate 22 of the rotation support member 20. Thus, it facilitates the second sensor 60 to detect rotation of the rotary plate 22 for obtaining the angular displacement of the main body 21 of the rotation support member 20 relative to the base 10.

In the embodiment, the positioning module 1 is configured to detect the linear displacement and the angular displacement at any point on a scan path. For example, the positioning module 1 is moved along a scan path on the surface of the object to be scanned. The scan path is not limited to a straight line. The wheel 40 can be affected by the frictional force of the surface of the object in different directions at any points of the scan path. Since the wheel 40 is offset from the first axis A1, the vertical connection line L between the wheel 40 and the first axis A1 tends to be parallel to the direction of the frictional force. Thus, the linear displacement and the angular displacement at any point on the scan path can be sensed accurately. Furthermore, in the embodiment, the base 10 further includes plural convex portions 14 disposed nearby the opening 13. When the wheel 40 is inforce by the frictional force, the plural convex portions 14 support the base 10. Moreover, the portion of the wheel 40 passing through the opening 13 is in constant contact with the surface of the object on the scan path. Consequently, it facilitates the positioning module 1 to stably move along the scan path on the surface of the object and accurately detect the linear displacement and the angular displacement at any point on the scan path.

Figure 6:
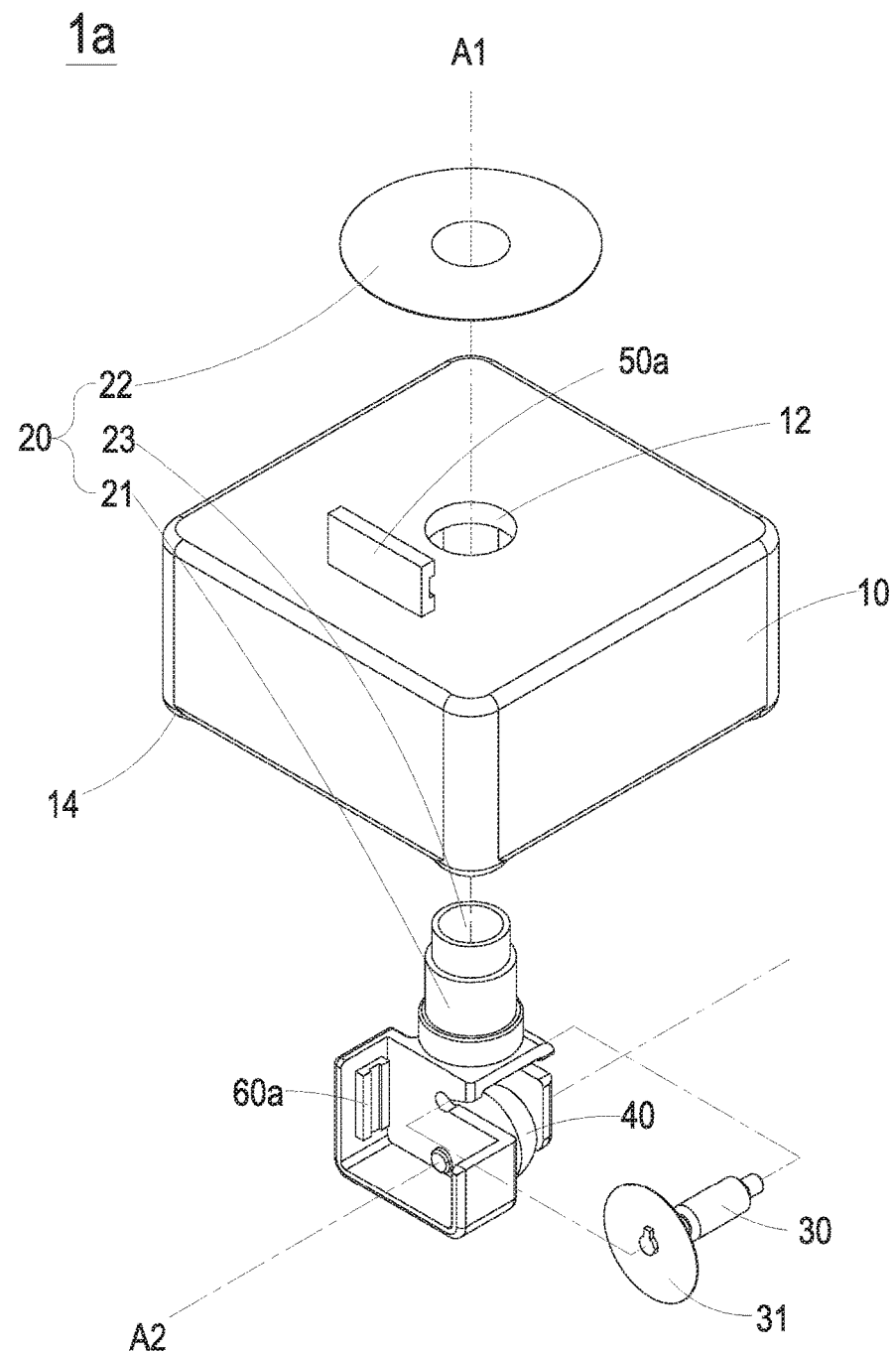
FIG. 6 is an exploded view illustrating the positioning module according to the second preferred embodiment of the present invention.
Figure 7A:
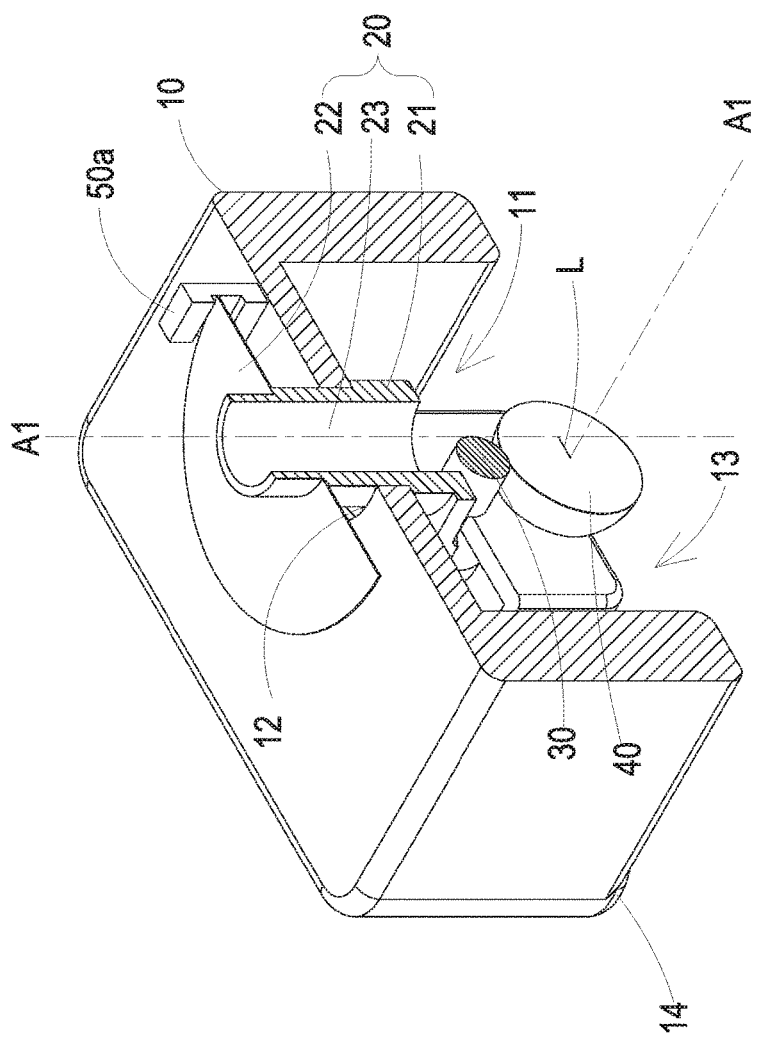
FIG. 7A is cross-sectional view taken along the line CC of FIG. 5.
Figure 7B:
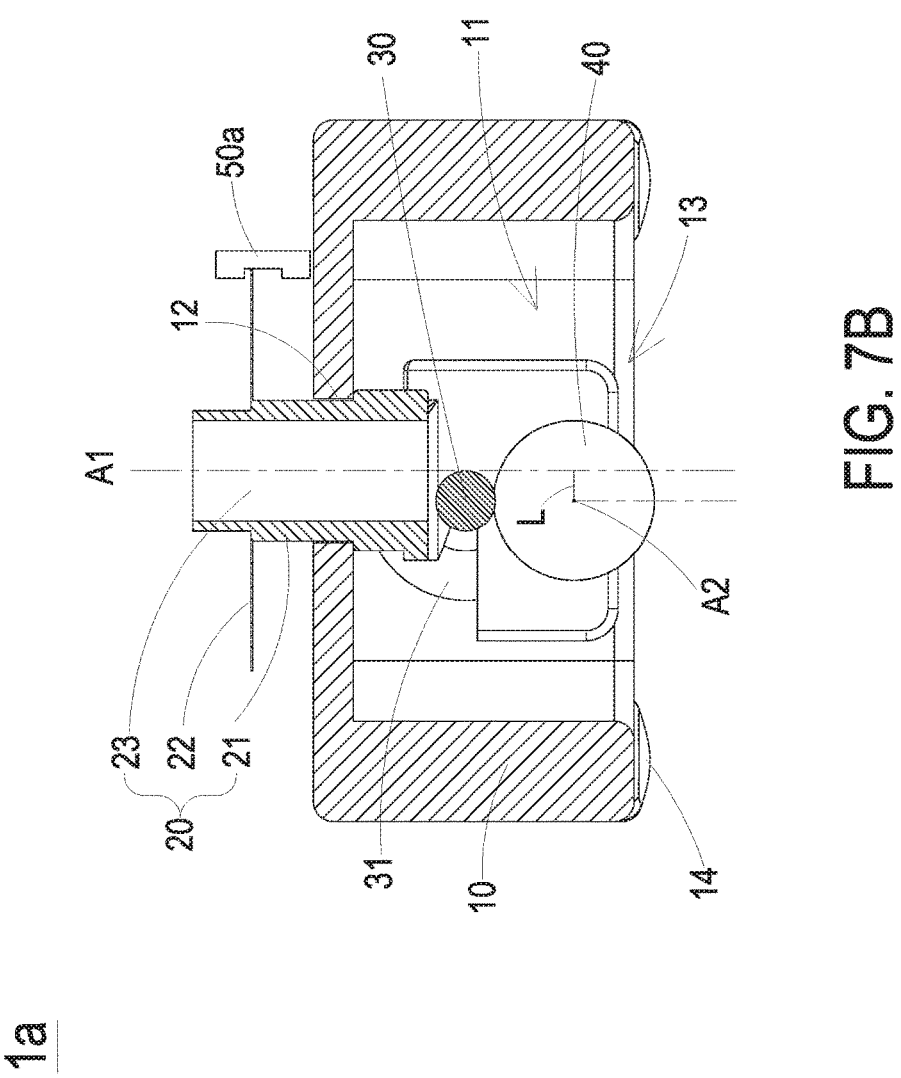
FIG. 7B is a lateral view of FIG. 7A.

FIG. 5 is a perspective view illustrating a positioning module according to a second preferred embodiment of the present invention. FIG. 6 is an exploded view illustrating the positioning module according to the second preferred embodiment of the present invention. FIG. 7A is cross-sectional view taken along the line CC of FIG. 5. FIG. 7B is a lateral view of FIG. 7A. In the embodiment, the structures, elements and functions of the positioning module 1a are similar to those of the positioning module 1 in FIGS. 1, 2, 3A-3B and 4A-4B, and are not redundantly described herein. Different from the positioning module 1 of FIGS. 1, 2, 3A-3B and 4A-4B having the first sensor 50 disposed on the rotary plate 22 of the rotation support member 20, in the embodiment, the first sensor 50a can be for example but not limited to a rotary encoder and disposed on the main body 21 of the rotation support member 20. In the meantime, a round plate 31 is disposed on an end of shaft body 30. While the wheel 40 drives the shaft body 30 to rotate, the round plate 31 and the shaft body 30 are rotated synchronously. Moreover, the first sensor 50a is relative to the round plate 31 disposed on the end of the shaft body 30, so that the first sensor 50a can be configured to detect rotation of the shaft body 30 and obtains the linear displacement of the main body 21 and the base 10. On the other hand, in the embodiment, the second sensor 60a can be for example but not limited to a rotary encoder, and disposed with respect to a peripheral edge of the rotary plate 22 of the rotation support member 20. Thus, it facilitates the second sensor 60a to detect rotation of the rotary plate 22 so as to obtain the angular displacement of the main body 21 of the rotation support member 20 relative to the base 10.

It is emphasized that the first sensor 50, 50a can obtain the linear displacement of the rotation support member 20 and the base 10 by detecting the rotation of the shaft body 30, the second sensor 60, 60a can obtain the angular displacement of the rotation support member 20 relative to the base 10 by detecting rotation of the rotary plate 22, but the present invention is not limited to the forgoing embodiments. Furthermore, the first sensor 50, 50a and the second sensor 60, 60a are one selected from a group consisting of a rotary encoder, an optical mouse sensor, a synchro, a resolver, a rotary variable differential transformer and rotary potentiometer, respectively. In addition, the installed position of the first sensor 50, 50a disposed on the rotation support member 20 can be adjustable according to the practical requirements without affecting the effects of the first sensor 50, 50a detecting rotation of the shaft body 30 and obtaining the linear displacement of the rotation support member 20 and the base 10. Similarly, the installed position of the second sensor 60, 60a disposed on the base 10 and relative to the rotary plate 22 can be adjustable according to the practical requirements. It is not redundantly described herein. It is noted that when the first sensor 50 and the second sensor 60 are both optical mouse sensors, since the optical mouse sensor itself has a smaller volume and operating space, it facilitates the positioning module 1 to minimize the entire size and be integrated in a handheld scanner effectively. In addition, when the linear displacement of the rotation support member 20 and the base 10 is obtained by the optical mouse sensor as an example of the first sensor 50 detecting the shaft body 30, since the surface characteristics of the shaft body 30 is constant, the first sensor 50 can accurately obtain the linear displacement of the rotation support member 20 and the base 10 with respect to the surface of the object to be scanned. It avoids the sensing accuracy error caused by the different surface characteristics of the scanned object.

In the above embodiments, the linear displacement of the rotation support member 20 and the base 10 obtained by the first sensor 50, 50a detecting the rotation of the shaft body 30, and the angular displacement of the rotation support member 20 relative to the base 10 obtained by the second sensor 60, 60a detecting rotation of the rotary plate 22 are relative to each other and constructed as a set of positioning data. When the positioning module 1, 1a is moved along the scan path, the information about any movement and rotation of the base 10 on the scan path can be obtained by means of detecting the plural sets of positioning data on the scan path.

Figure 8:
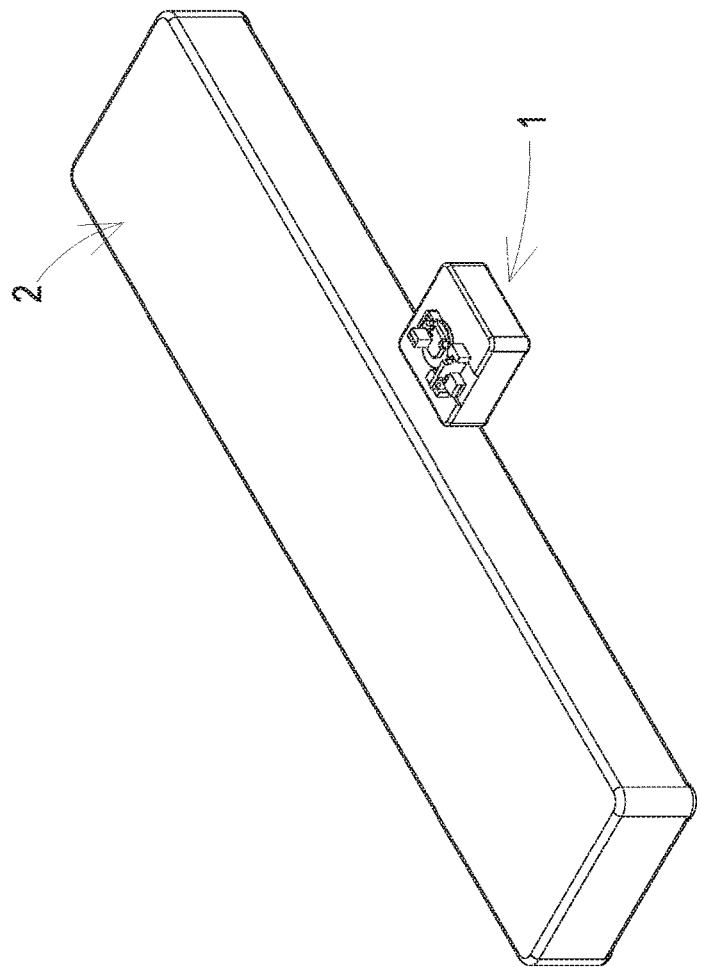
FIG. 8 is a perspective view illustrating a handheld scanner according to a preferred embodiment of the present invention.
Figure 9:
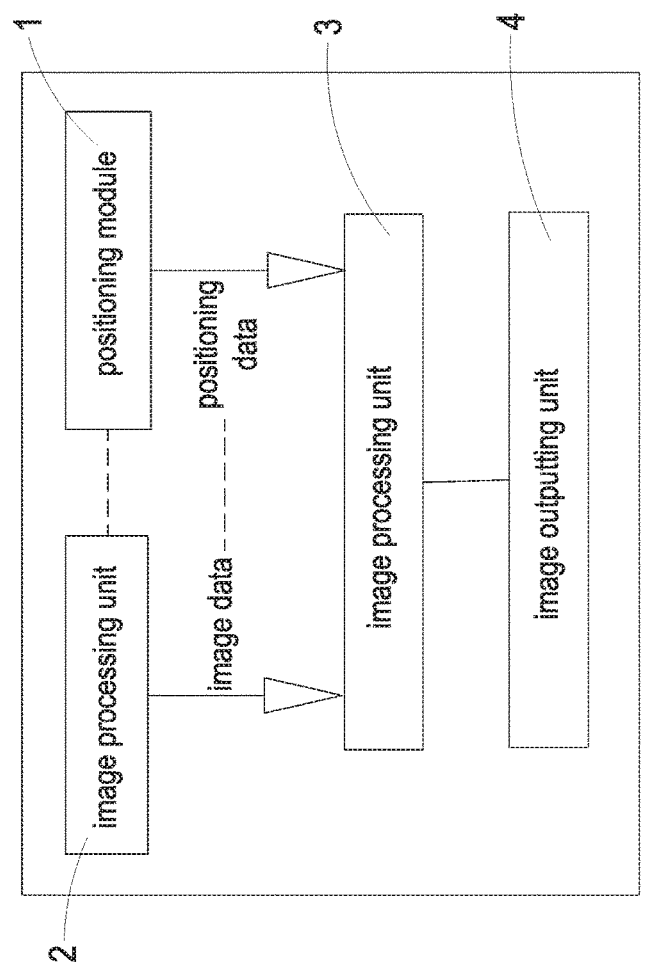
FIG. 9 is a block diagram illustrating the handheld scanner according the preferred embodiment of the present invention.
Figure 10:
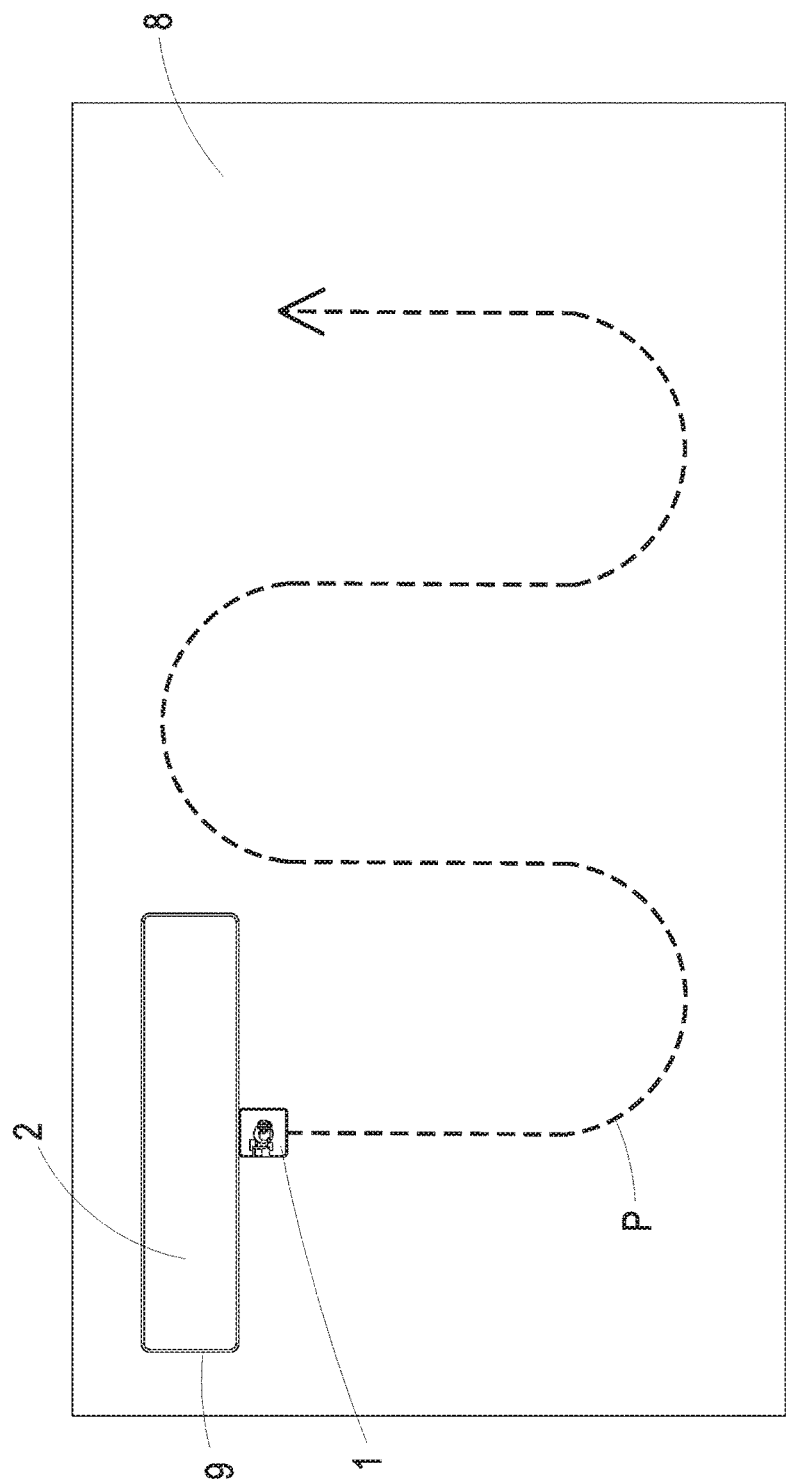
FIG. 10 shows the handheld scanner executing a scanning operation along a scan path.

According to the positioning module 1, 1a in the above embodiments, a handheld scanner having the positioning module is provided at the same time. FIG. 8 is a perspective view illustrating a handheld scanner according to a preferred embodiment of the present invention. FIG. 9 is a block diagram illustrating the handheld scanner according the preferred embodiment of the present invention. FIG. 10 shows the handheld scanner executing a scanning operation along a scan path. In the embodiment, the handheld scanner 9 includes a positioning module 1, an image capture unit 2, an image processing unit 3 and an image outputting unit 4. The image capture unit 2 is configured to capture plural image data along a scan path P on a surface of an object, and the object can be for example but not limited to a document to be scanned. The positioning module 1 is connected with the image capture unit 2. When the image capture unit 2 captures plural image data along the scan path P on the surface of the object, the positioning module 1 generates plural sets of positioning data relative to the plural image data. In the embodiment, the structures, elements and functions of the positioning module 1 are similar to those of the positioning module 1 in FIGS. 1, 2, 3A-3B and 4A-4B, and are not redundantly described herein. On the scan path P, the relative position of the base 10 of the positioning module 1 and the image capture unit 2 remains unchanged. For example, the base 10 of the positioning module 1 can be fixed and connected to the central side edge of the image capture unit 2. When the image capture unit 2 is moved along the scan path P, the wheel 40 (as shown in FIGS. 1, 2, 3A-3B and 4A-4B) of the positioning module 1 and the surface of the object 8 are in constant contact with each other. In an embodiment, the image capture unit 2 and the base 10 of the positioning module 1 are further integrated together. For example, the image capture unit 2 and the positioning module 1 are integrated together in one base. It has to be emphasized that the combination method of the image capture unit 2 and the positioning module 1 is not an essential feature limited the present invention. Any combination method for fixing the relative position of the base 10 of the positioning module 1 and the image capturing unit 2 during the motion of the image capture unit 2 and the wheel 40 of the positioning module 1 along the scan path P is applicable to the present invention. It is not redundantly described herein.

In the embodiment, the relative position of the base 10 of the positioning module 1 and the image capture unit 2 is constant in the handheld scanner 9. For example, the base 10 of the positioning module 1 is fixed to the front edge of the image capture unit 2. When the handheld scanner 9 performs a scanning operation along the scan path P on the object surface 8, the image capture unit 2 captures plural image data along the scan path P on the object surface 8. In the meantime, the positioning module 1 generates plural sets of positioning data relative to the plural image data along the scan path P synchronously. Each set of positioning data includes the linear displacement and the angular displacement. The linear displacement of the rotation support member 20 and the base 10 is obtained by the first sensor 50 detecting the rotation of the shaft body 30. The angular displacement of the rotation support member 20 relative to the base 10 is obtained by the second sensor 60 detecting rotation of the rotary plate 22. In the embodiment, the positioning module 1 and the image capture unit 2 are further connected to the image processing unit 3. The plural image data and plural sets of positioning data obtained along the scan path are transmitted to the image processing unit 3. After receiving the plural image data and the plural sets of positioning data relative to the plural image data, the image processing unit 3 combines the plural image data according to the plural sets of positioning data to generate a scan image of the scanned object surface 8. Consequently, the scanning operation for the large-size documents can be achieved and the scan image of the scanned object surface 8 can be obtained accurately. In the embodiment, the handheld scanner 9 further includes an image outputting unit 4 connected to the image processing unit 3 for outputting the forgoing scan image of the object surface 8.

In the embodiment, when the handheld scanner 9 is moved along a straight line to scan the object surface 8, the forgoing scan path P is a straight and all of the angular displacements in the plural sets of positioning data relative to the plural image data are zero radians. The plural image data can be combined easily according to the linear displacements of the plural sets of positioning data to obtain the scan image of the object surface 8. It is noted that when the handheld scanner 9 is rotated at a fixed point to scan the object surface 8, the scan path P is a circle. The obtained linear displacements of the plural sets of positioning data relative to the plural image data tend to be zero, but the angular displacements thereof are not zero. Even though the linear displacements of the plural set of positioning data are all zero on the scan path P, the plural image data can be combined according to the corresponding angular displacements of the plural set of positioning data to generate the scanned image of the object surface 8 accurately. In other words, when the handheld scanner 9 performs a scanning operation, any scan path including motion and rotation can be positioned accurately by the positioning module 1 of the present invention.

In summary, the present provides a positioning module and a handheld scanner using the same. The positioning module is relative to the handheld scanner and configured to detect plural sets of positioning data along a scan path of the handheld scanner. Each set of positioning data is constructed by a linear displacement and an angular displacement. The plural sets of positioning data are relative to plural image data captured by the handheld scanner along the scan path. By combining the plural image data according to the corresponding positioning data, it facilities to achieve the scanning operation for large-scale documents. Moreover, with two sensors detecting linear displacements and angular displacements of the combination of an offset swivel wheel and a shaft body in the positioning module, it facilitates the scan path of the handheld scanner to be positioned accurately. In case of two sensors constructed by the optical mouse sensors, it further facilitates the positioning module to minimize the entire size and be integrated in the handheld scanner effectively. Since the optical mouse sensors achieve positioning by detecting the offset swivel wheel and the shaft body instead of detecting the surface of the scanned object directly, it avoids the sensing accuracy error of the positioning module caused by the different surface characteristics of the scanned object.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A positioning module, comprising:
    a base comprising an accommodation space, a through hole and an opening, wherein the through hole is relative to the opening, and the through hole and the opening are communicated with the accommodation space;
    a rotation support member connected pivotally with the base by passing through the through hole and rotated relative to the base about a first axis, wherein the rotation support member comprises a main body and a rotary plate, the rotary plate is centered on the first axis, and the main body is received in the accommodation space and extends along a direction from the through hole to the opening;
    a shaft body connected pivotally to the main body of the rotation support member;

a wheel connected pivotally to an end of the main body of the rotation support member and relative to the shaft body, wherein the wheel is in constant contact with the shaft body and partially passes through the opening, wherein while the wheel is affected by a frictional force and rotates about a second axis, the main body is moved to generate a linear displacement and the shaft body is rotated, wherein the second axis is offset from the first axis, wherein while the wheel is affected by the frictional force, the wheel drives the main body of the rotation support member to rotate about the first axis at an angular displacement;

a first sensor disposed on the rotation support member and configured to detect rotation of the shaft body to obtain the linear displacement of the main body; and a second sensor disposed on the base and configured to detect the rotary plate to obtain the angular displacement of the main body of the rotation support member.

2. The positioning module according to claim 1, wherein the rotary plate is connected with the main body via the through hole, and the rotary plate and the main body are located at two opposite ends of the through hole, respectively.

3. The positioning module according to claim 1, wherein the second sensor is disposed with respect to a peripheral edge of the rotary plate.

4. The positioning module according to claim 1, wherein the rotation support member comprises an axle hole passing through the rotary plate and the main body along the first axis, wherein the first sensor disposed on the rotary plate of the rotation support member and relative to the shaft body through the axle hole so as to detect rotation of the shaft body.

5. The positioning module according to claim 1, wherein the first sensor is disposed on the main body and relative to the shaft body so as to detect rotation of the shaft body.

6. The positioning module according to claim 1, wherein the first sensor and the second sensor are one selected from a group consisting of a rotary encoder, an optical mouse sensor, a synchro, a resolver, a rotary variable differential transformer and rotary potentiometer, respectively.

7. The positioning module according to claim 1, wherein the first axis and the second axis include a vertical connection line perpendicular to the first axis and the second axis, respectively.

8. The positioning module according to claim 7, wherein while the wheel is affected by the frictional force in a direction, the vertical connection line tends to be parallel to the direction of the frictional force, wherein while the vertical connection line is parallel to the direction of the frictional force, the angular displacement is zero radians.

9. The positioning module according to claim 1, wherein the first axis and the second axis are two skew lines.

10. The positioning module according to claim 1, wherein the linear displacement and the angular displacement of the main body are configured to correspond to a scan path of the base.

11. The positioning module according to claim 1, wherein the base comprises plural convex portions disposed nearby the opening, wherein while the wheel is inforce by the frictional force, the plural convex portions support the base.

12. A handheld scanner comprising:

an image capture unit configured to capture plural image data along a scan path on a surface of an object; and a positioning module connected with the image capture unit, wherein while the image capture unit captures plural image data along the scan path on the surface of the object, the positioning module generates plural sets of positioning data relative to the plural image data, and comprises:

a base comprising an accommodation space, a through hole and an opening, wherein the through hole is relative to the opening, and the through hole and the opening are communicated with the accommodation space;

a rotation support member connected pivotally with the base by passing through the through hole and rotated relative to the base about a first axis, wherein the rotation support member comprises a main body and a rotary plate, the rotary plate is centered on the first axis, and the main body is received in the accommodation space and extends along a direction from the through hole to the opening;

a shaft body connected pivotally to the main body of the rotation support member;

a wheel connected pivotally to an end of the main body of the rotation support member and relative to the shaft body, wherein the wheel is in constant contact with the shaft body and partially passes through the opening, wherein while the wheel is affected by a frictional force and rotates about a second axis, the main body is moved to generate a linear displacement and the shaft body is rotated, wherein the second axis is offset from the first axis, wherein while the wheel is affected by the frictional force, the wheel drives the main body of the rotation support member to rotate about the first axis at an angular displacement;

a first sensor disposed on the rotation support member and configured to detect rotation of the shaft body to obtain the linear displacement of the main body; and a second sensor disposed on the base and configured to detect the rotary plate to obtain the angular displacement of the main body of the rotation support member, wherein each set of positioning data includes the linear displacement and the angular displacement.

13. The handheld scanner according to claim 12, further comprising an image processing unit connected to the image capture unit and the positioning module, wherein the image processing unit receives the plural image data and the plural sets of positioning data relative to the plural image data, and generates a scanned image of the surface of the object according the plural image data and the plural sets of positioning data.

14. The handheld scanner according to claim 12, wherein the rotation support member comprises an axle hole passing through the rotary plate and the main body along the first axis, wherein the first sensor disposed on the rotary plate of the rotation support member and relative to the shaft body through the axle hole so as to detect rotation of the shaft body.

15. The handheld scanner according to claim 12, wherein the first sensor is disposed on the main body and relative to the shaft body so as to detect rotation of the shaft body.

16. The handheld scanner according to claim 12, wherein the first sensor and the second sensor are one selected from a group consisting of a rotary encoder, an optical mouse sensor, a synchro, a resolver, a rotary variable differential transformer and rotary potentiometer, respectively.

17. The handheld scanner according to claim 12, wherein the first axis and the second axis include a vertical connection line perpendicular to the first axis and the second axis, respectively.

18. The handheld scanner according to claim 17, wherein while the wheel is affected by the frictional force in a direction, the vertical connection line tends to be parallel to the direction of the frictional force, wherein while the vertical connection line is parallel to the direction of the frictional force, the angular displacement is zero radians.

19. The handheld scanner according to claim 12, wherein the first axis and the second axis are two skew lines.

20. The handheld scanner according to claim 12, wherein the base comprises plural convex portions disposed nearby the opening, wherein while the wheel is affected by the frictional force, the plural convex portions support the base.

\* \* \* \* \*